United States Patent [19]

Baskerville, Jr. et al.

[11] 3,936,537

[45] Feb. 3, 1976

[54] DETERGENT-COMPATIBLE FABRIC SOFTENING AND ANTISTATIC COMPOSITIONS

[75] Inventors: Ralph James Baskerville, Jr.; Francis Gennaro Schiro, both of Cincinnati, Ohio

[73] Assignee: The Procter & Gamble Company, Cincinati, Ohio

[22] Filed: Nov. 1, 1974

[21] Appl. No.: 520,187

[52] U.S. Cl. ............. 427/242; 252/8.8; 252/528; 252/547; 427/394; 428/279
[51] Int. Cl.² ................. B05D 3/12; D06M 13/46
[58] Field of Search...................... 252/8.8, 528, 547

[56] References Cited
UNITED STATES PATENTS

| | | | |
|---|---|---|---|
| 2,874,074 | 2/1959 | Johnson | 428/265 |
| 3,349,033 | 10/1967 | Zuccarelli | 252/8.8 |
| 3,451,927 | 6/1969 | Tune | 252/8.75 |
| 3,546,115 | 12/1970 | Gill et al. | 252/8.8 |
| 3,644,203 | 2/1972 | Lamberti et al. | 252/8.75 |

FOREIGN PATENTS OR APPLICATIONS

| | | | |
|---|---|---|---|
| 811,083 | 2/1974 | Belgium | 428/279 |
| 873,214 | 7/1961 | United Kingdom | 252/8.8 |

*Primary Examiner*—Harold D. Anderson
*Assistant Examiner*—Edward Woodberry
*Attorney, Agent, or Firm*—Julius P. Filcik; Richard C. Witte; Thomas H. O'Flaherty

[57] ABSTRACT

Detergent-compatible antistatic compositions are described containing a combination of cationic antistatic agents and certain organic adjuncts as discrete particles. Preferred compositions also include certain smectite clay materials to permit the simultaneous attainment of fabric softening, static-reduction and cleansing effects of fabrics washed therein.

36 Claims, No Drawings

DETERGENT-COMPATIBLE FABRIC SOFTENING AND ANTISTATIC COMPOSITIONS

BACKGROUND OF THE INVENTION

This invention relates to compositions adapted to provide antistatic effects in fabric laundering operations. More particularly, it relates to the provision of these effects while simultaneously cleansing fabrics by means of conventional synthetic detergent compounds and organic or inorganic detergent builders.

Various quaternary ammonium compounds known in the art possess antistatic properties. These compounds are well known to be incompatible with anionic surfactants commonly employed in the laundering of fabrics. The opposite electrical charges of the two species lead not only to the mutual attraction of the surfactants, which results in formation of insoluble compounds and the depletion of the respective materials, but also to reversal of the electrical charges on surfaces exposed to the wash liquor. This reversal results in undesirable effects such as increased soil redeposition on fabrics and poorer soil removal. A further consequence of this incompatibility is the inhibition of the tendency of the cationic surfactant to deposit on the fabric surface and an associated reduction in the antistatic benefit delivered to the laundered fabric.

It is an object of the present invention to provide particulate additive products which can be added to laundry detergent formulations to reduce the tendency of fabrics that are washed therewith and then subjected to machine drying to generate or retain static electricity.

It is also an object of the present invention to provide detergent compositions incorporating discrete particulates containing antistat materials capable of reducing the buildup of static charges on fabrics that are washed therewith and are then subjected to machine drying.

It is a further object of the present invention to provide fabric softening and antistatic compositions capable of providing their effects in the presence of conventional detergent compositions to thereby concurrently launder, soften, and impart antistatic benefits to fabrics.

It is yet another object of the present invention to provide compositions containing certain clay fabric softening agents and quaternary ammonium antistatic agents adapted for to use in the washing cycle of a laundering operation.

PRIOR ART

As noted hereinabove, there is a substantial body of art relating to fabric antistat agents which assertedly can be applied to fabrics in the presence of various surfactants. Pursuant to the provisions of the Notice of the Commissioner of Patents relating to the citation of prior art, appearing in the Official Gazette, Sept. 3, 1974, a complete compilation of references relevant to the instant invention and known to Applicants will be placed on file in the U.S. Patent Office.

SUMMARY OF THE INVENTION

The present invention is based in part upon the discovery that the interactive effects of antistatic agents, particularly quaternary ammonium antistatic agents, and conventional detergent laundering compositions can be mitigated by incorporating the antistatic agent together with an organic dispersion inhibitor in the form of discrete particles, these particles having a specified range of particle size, solubility in water and melting point. These particulate materials can be employed, either as additives to supplement conventional laundering products when the latter are added to the wash solution or as part of a product designed to provide textile materials with simultaneous cleansing, antistatic and optionally fabric-softening effects.

According to one aspect of the invention there is provided a particulate additive product containing as essential ingredients a quaternary ammonium antistat agent and an organic dispersion inhibitor in an intimate mixture.

The present invention also encompasses, as integral formulations, compositions containing the materials hereinbefore defined in combination with synthetic detergent compounds and organic or inorganic builder salts. Such compositions, merely added to water, provide in a single step the provision of a laundering bath adapted to the provision of simultaneous cleansing, softening, and antistat effects.

In a method aspect, the invention encompasses a method of simultaneously cleansing, softening, and providing antistatic effects on textile fabrics which comprises the steps of (1) treating the textile fabrics in an aqueous laundry bath containing detergent, clay, and a particulate material comprising an antistatic quaternary ammonium agent and a dispersion inhibitor as defined herein, and (2) subjecting the treated textile fabrics to drying at a temperature in the range of 125°F to 200°F.

DETAILED DESCRIPTION OF THE INVENTION

The additive product and method of this invention employ two essential ingredients; the quaternary ammonium antistatic agent; and the solid organic dispersion inhibitor. The detergent compositions of the invention additionally can comprise a water-soluble detergency compound and a detergency builder salt. The quaternary ammonium compound provides antistatic effects on the fabrics and adds an increment of softening benefit to the fabrics while the detergent and builder components provide the known cleansing and building effects. The various components of the compositions herein are described in greater detail hereinafter, together with the methods of preparation of the particulate detergent additive products and detergent compositions containing them. The method of preparation of the individual components of the additive products and detergent compositions incorporating them are well known in the art and form no part of the present invention.

Particulate detergent products suited herein as additives to the detergent washing bath of a laundering operation, and termed "additive products" herein comprise:

a. from about 80 to about 20% by weight of a quaternary ammonium compound of the formula:

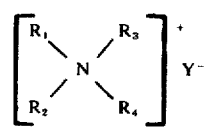

wherein $R_1$ and preferably also $R_2$ represent an organic radical containing a group selected from a $C_{16}$–$C_{22}$ aliphatic radical or an alkyl phenyl or alkyl benzyl radical having 10–16 atoms in the alkyl chain, $R_3$ and $R_4$ represent hydrocarbyl groups containing from 1 to about 4 carbon atoms, $C_2$–$C_4$ hydroxy alkyl groups and cyclic structures in which the nitrogen atom forms part of the ring, and Y is an anion such as halide or methylsulfate; and b. from about 20 to about 80% by weight of a solid organic dispersion inhibitor having a softening point in the range of from 100°F to 200°F and a solubility in water of 50 ppm max at 25°C, selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials, and mixtures thereof, substantially all of the individual particles having a size within the range $10\mu$ to $500\mu$, said product having a solubility in water of 50 ppm max at 25°C and having a softening point in the range of 100°F to 200°F.

Built laundry detergent compositions of the invention comprise (a) from about 10 to about 25% by weight of an anionic surfactant; (b) from about 10 to about 60% by weight of an organic or inorganic detergent builder salt; (c) from about 3 to about 25% by weight of the composition of a particulate combination consisting essentially of: (1) from about 80 to about 20% by weight of a quaternary ammonium antistatic agent of the formula:

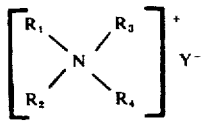

wherein $R_1$ and preferably also $R_2$ represent an organic radical containing a group selected from a $C_{16}$–$C_{22}$ aliphatic radical or an alkyl phenyl or alkyl benzyl radical having 10–16 atoms in the alkyl chain, $R_3$ and $R_4$ represent hydrocarbyl groups containing from about 1 to about 4 carbon atoms and wherein Y is an anion, e.g., fluoride, chloride, bromide, or methylsulfate; and b. from about 20 to about 80% of a solid organic dispersion inhibitor having a softening point in the range of from 100°F to 200°F and a solubility in water of 50 ppm max at 25°C, selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof, the individual particles having a size in the range of $10\mu$ to $500\mu$, a solubility in water of 50 ppm max at 25°C and a softening point in the range of 100°F to 200°F.

The detergent compositions herein provide a solution pH of from about 7 to about 12, preferably from about 9 to about 11, when dissolved in water at a concentration of about 0.12% by weight.

Antistatic Agent

The quaternary ammonium antistatic agents will normally be employed in the particulate additive products in an amount of from about 80 to about 20% preferably from about 80 to about 50%, and most preferably from 65 to 50% by weight of the additive particles. The quaternary ammonium antistatic agent will normally be present in the detergent compositions of the invention in an amount of from about 0.5 to about 15% preferably in an amount of from about 1 to about 10% and most preferably in an amount of from about 2 to 5% by weight of the composition. Whether an additive or detergent composition of the invention is employed in providing an aqueous laundering bath or liquor, an amount sufficient to provide a concentration of quaternary ammonium compound in the bath or liquor of from about 5 ppm (parts per million) to about 250 ppm will normally be employed.

The antistatic agents useful herein are quaternary ammonium salts of the formula $[R_1R_2R_3R_4N]^+Y^-$ wherein $R_1$ and preferably $R_2$ represent an organic radical containing a group selected from a $C_{16}$–$C_{22}$ aliphatic radical or an alkyl phenyl or alkyl benzyl radical having 10–16 atoms in the alkyl chain, $R_3$ and $R_4$ represent hydrocarbyl groups containing from 1 to about 4 carbon atoms, or $C_2$–$C_4$ hydroxy alkyl groups and cyclic structures in which the nitrogen atom forms part of the ring, and Y is an anion such as halide or methosulfate.

In the context of the above definition, the hydrophobic moiety (i.e., the $C_{16-22}$ aliphatic, $C_{10-16}$ alkyl phenyl or alkyl benzyl radical) in the organic radical $R_1$ may be directly attached to the quaternary nitrogen atom or may be indirectly attached thereto through an amide, ester, alkoxy, ether, or like grouping.

The quaternary ammonium antistatic compounds useful herein include both water soluble and substantially water insoluble materials. For example, the imidazolinium compounds of the structure

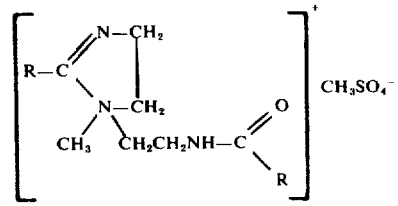

where R is a $C_{16}$–$C_{20}$ alkyl group, possess appreciable water solubility but can be utilized in the present invention by mixture with the appropriate level and type of organic dispersion inhibitor so as to give an ultimate particle solubility in water of less than 50 ppm at 25°C.

Similarly other relatively water-soluble quaternary ammonium antistatic agents can be used such as the diisostearyl dimethyl ammonium chlorides disclosed in U.S. Pat. No. 3,395,100 to Fisher et al.

However, the preferred quaternary ammonium antistatic agents useful herein are characterized by their limited solubility in water. That is to say, such quaternary salts are essentially insoluble in water, existing therein in what appears to be the mesomorphic liquid crystalline state.

The quaternary ammonium antistatic agents used in this invention can be prepared in various ways well known in the art. Many such materials are commercially available. The quaternaries are often made from alkyl halide mixtures corresponding to the mixed alkyl chain lengths in fatty acids. For example, the "di-tallow" quaternaries are made from alkyl halides having mixed $C_{14}$–$C_{18}$ chain lengths. Such mixed di-long chain quaternaries are useful herein and are preferred from a cost standpoint.

As noted above, essentially any anionic group can be the counter-ion in the quaternary compounds used herein. The anionic groups in the quaternary compounds can be exchanged, one for another, using standard anion exchange resins. Thus, quaternary ammonium salts having any desired anion are readily available. While the nature of such anions has no effect on the compositions and processes of this invention, chloride ion is the preferred counter-ion from an availability standpoint.

The following are representative examples of substantially water-insoluble quaternary ammonium antistatic agents suitable for use in the compositions and processes of the instant invention. All of the quaternary ammonium compounds listed can be formulated with the detergent compositions herein, but the compilation of suitable quaternary compounds hereinafter is only by way of example and is not intended to be limiting of such compounds. Dioctadecyldimethylammonium chloride is an especially preferred quaternary antistatic agent for use herein by virtue of its high antistatic activity; ditallow dimethyl ammonium chloride is equally preferred because of its ready availability and its good antistatic activity; other useful di-long chain quaternary compounds are dicetyldimethyl-ammonium chloride; bis-docosyldimethylammonium chloride; didodecyl-dimethylammonium chloride; ditallowdimethylammonium bromide; dioleoyldimethylammonium hydroxide; ditallowdiethyl-ammonium chloride; ditallowdipropylammonium bromide; ditallow-dibutylammonium fluoride, cetyldecylmethylethylammonium chloride, bis-[ditallowdimethylammonium]sulfate; tris-[ditallow-dimethylammonium]phosphate; and the like.

Organic Dispersion Inhibitor

The essential organic dispersion inhibitor comprises about 20 to about 80%, preferably from about 20 to about 50%, and most preferably 35 to about 45% by weight of the particulate additive product. In the built detergent embodiments, the dispersion inhibitor is present in an amount from about 0.5 to about 15%, preferably from about 1 to about 10% by weight of the total composition. Normally, in either the additive or detergent embodiments of the invention, an amount of dispersion inhibitor sufficient to provide a weight ratio of quaternary ammonium compound to dispersion inhibitor of from about 4:1 to about 1:1, and preferably from 2:1 to 3:2, is employed.

The dispersion inhibitor should have a solubility in water of 50 ppm max at 25°C and a softening point in the range of 100°–200°F, preferably 125°–200°F, and is selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof.

Preferred herein because of ready availability is tallow alcohol, but useful dispersion inhibitors include other fatty alcohols in the $C_{14}$–$C_{26}$ range such as myristyl alcohol, cetyl alcohol, stearyl alcohol, arachidyl alcohol, behenyl alcohol, and mixtures thereof.

Saturated fatty acids having 12 to 24 carbon atoms in the alkyl chain can be used such as: lauric acid, myristic acid, palmitic acid, stearic acid, arachidic acid, and behenic acid, as well as mixtures of these, particularly those derived from naturally occurring sources such as tallow, coconut, and marine oils.

Esters of the aliphatic alcohols and fatty acids are useful dispersion inhibitors, provided they have a total of more than 22 carbon atoms in the acid and alkyl radicals.

Long chain $C_{22}$–$C_{30}$ paraffinic hydrocarbon materials such as the saturated hydrocarbon octacosane having 28 carbon atoms can also be used.

Another preferred class of materials useful in the present invention are the water insoluble sorbitan esters which comprise the reaction product of $C_{12}$–$C_{26}$ fatty acyl halides or fatty acids and the complex mixtures of cyclic anhydrides of sorbitol collectively known as "sorbitan". The reaction sequence necessary to produce such sorbitan esters from sorbitol is set out schematically below, the esters being shown in the fully esterified form.

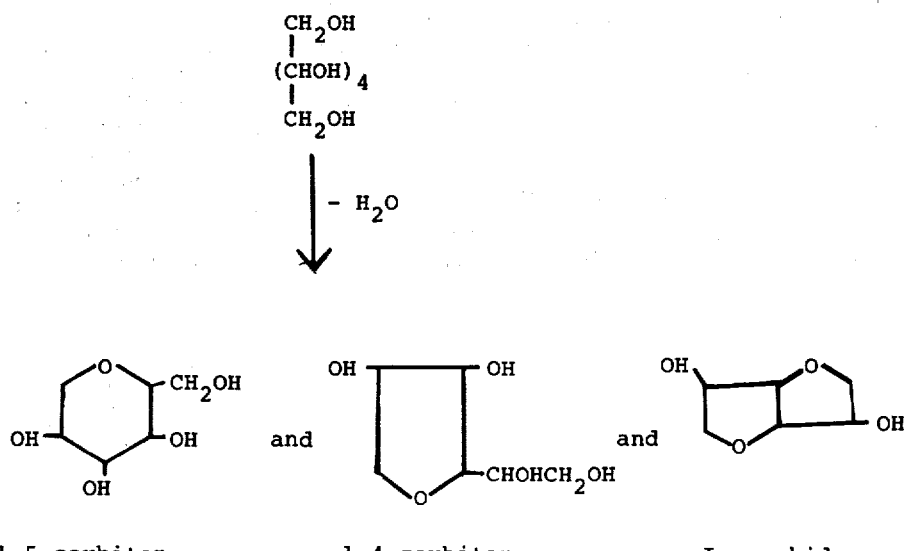

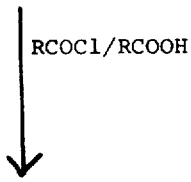

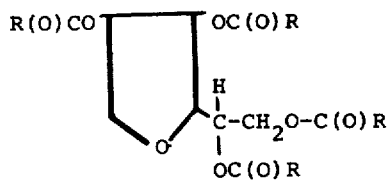 and 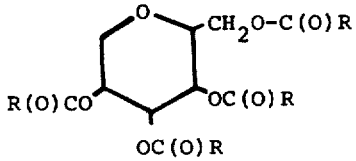

and 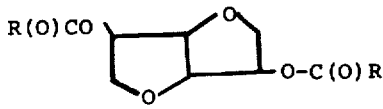

The sorbitan esters are, in turn, complex mixtures of mono, di, tri, and tetra ester forms, of which the tri and tetra are the least water-soluble and hence the most preferred for the purposes of the present invention. However, commercially available mixtures of the various forms are quite satisfactory provided that the mixture satisfies the water solubility and melting point range constraints for the organic dispersion inhibitor. Typical fatty acids that are suitable for the alkyl portion of the ester are palmitic, stearic, docosanoic, and behenic acids and mixtures of any of these. These sorbitan esters, particularly the tri and tetra esters, provide a degree of fabric softening in addition to their function as dispersion inhibitors. Minor proportions of unsaturated $C_{10}$–$C_{26}$ fatty acids, present in commercially available fatty acid mixtures such as coconut-, palm-, tallow-, and marine oil-derived acids are also acceptable. Another preferred group of materials are the $C_{20}$–$C_{26}$ mono- and di- ester forms which also provide a degree of fabric softening performance in addition to their function as dispersion inhibitors.

Materials of this general class are commercially available under various trade names, e.g., the Span series sold by Atlas Chemical Corporation.

Particulate Additive Product

The particulate additive product comprises a mixture of the quaternary ammonium antistatic agent and the organic dispersion inhibitor in a weight ratio of 4:1 to 1:4, the individual particle size of the product lying in the range $10\mu$ to $500\mu$, preferably $25\mu$ to $250\mu$, and most preferably $50\mu$ to $100\mu$. Further essential requirements are that the particulate product should not have a solubility in water at 25°C of greater than 50 ppm, preferably less than 10 ppm and that the softening or melting point of the product should lie in the range 100° to 200°F, preferably 150° to 175°F.

As acknowledged in the prior art, the combination of cationic organic materials with conventional anionic surfactant-containing detergent compositions has traditionally been regarded as nugatory because of the tendency for the oppositely-charged moieties to interact. The interaction results in the depletion of both species and leads to a lowering both of the cleaning and sudsing performance of the detergent and of the fabric softening and/or antistat performance of the cationic material.

It has been determined that this interaction is a function of the ability of the cationic material to disperse in aqueous media and that if this dispersion is inhibited or prevented, then the disadvantageous effects seen hitherto can be avoided.

The accompanying Table shows the particulate size range of a typical, but preferred, quaternary ammonium material under several conditions of product incorporation and usage.

H

| | PARTICLE SIZE COMPARISON OF VARIOUS FORMS OF DTDMAC | |
|---|---|---|
| Physical Form | In Product | In the Wash Solution |
| In typical commercial liquid softeners | 0.1 to $2\mu$ | 0.1 to $2\mu$ |
| As 95% active solid particles | 100 to $300\mu$ | 2 to $10\mu$ |
| As particles combined with tallow alcohol | 200 to $400\mu$ | 50 to $100\mu$ |

Ditallow dimethyl ammonium chloride (DTDMAC) is substantially insoluble in water, but if the immersion of a solid particle of DTDMAC in water is observed microscopically, the particle can be seen to absorb water very rapidly, swelling to become an amorphous jelly-like mass which disperses easily into small, ultimate particles of about 0.1 to $2\mu$ in size.

In the form of a commercially available liquid softener product, sold as a 5% solution in water, the dispersed particle size of the quaternary is approximately the same as that in water and little change occurs on dilution in the rinse water where the product is applied. However, addition of this product to the wash causes a marked decrease in sudsing and cleaning performance, while not providing any noticeable antistat or softening benefit to the fabrics. It is postulated that these effects are due to the large surface area: mass ratio of the antistat particles which results in an appreciable proportion of the anionic surfactants being used to not only neutralize the positive charge of the quaternary, but also adsorb on the neutralized particle and convert it into an anionic particle. This reverses the force normally tending to attract the quarternary cation to the anionic fabric surface and as the particles are very small, they are not large enough to be trapped in the fabric fibers so that no deposition or benefit accrues.

The use of a solid powdered form of the quaternary, while ensuring that the initial particle size on contact with water is larger, does not prevent the attainment of a small, ultimate particle size, although it is larger than that obtained when a liquid product is diluted. It is believed that this ultimate particle size is typical of that realized by quaternary materials that have been incorporated into granular products by addition to the detergent slurry prior to spray drying. Some antistatic benefit can be obtained if high levels of the quaternary, e.g., >10% by weight of the product, are used although cleaning and sudsing are sacrificed.

However, if in accordance with the present invention, the quaternary antistat material is intimately mixed, for example, by co-melting, with a solid organic material having a low water solubility and a relatively high softening temperature and then formed into a particle of a specified size range, these previously mentioned negative effects can be virtually eliminated. The provision of such a mixture with a particle size in the range 10 to $500\mu$ significantly reduces the surface area of the quaternary exposed to the solution, and hence its ability to absorb water and disperse. Depletion of the anionic surfactants in the wash is thereby reduced and the structural integrity of the particulates is retained so that they are trapped by the fibers during the wash cycle. Exposure of the fabrics to the elevated temperatures of a heated rotary dryer then spreads the quaternary-inhibitor mixture over the surface of the fabrics to give the desired antistat benefit, together with some softening effect.

Optimum results are seen when a preparative technique is used that leads to a particle of approximately $250\mu$ in size that comprises an aggregation of smaller particles of about 25 to $50\mu$. In solution, the larger particle disintegrates to leave the smaller particles that are not visible to the naked eye on the fabrics but are still large enough both to avoid significant surfactant depletion and to be trapped by the fabric fibers.

Quaternary softening and antistat materials are conventionally supplied as a mixture with a solvent material such as a lower alkarol, e.g., isopropanol. This aids dispersion in aqueous media but is disadvantageous to the present invention. Consequently, quaternary materials for use in this invention are preferably low in solvent and ideally are substantially free thereof.

It will be appreciated that the greater the water solubility of the quaternary ammonium compound, the larger will be the amount of organic dispersion inhibitor and/or the smaller its water solubility in order to satisfy the essential criteria of the invention. Correspondingly for a particular quaternary ammonium compound the greater the water solubility of an organic dispersion inhibitor, the more will have to be used.

The particulate detergent additive product is made by intimately mixing the quaternary antistat and the organic dispersion inhibitor and then forming this mixture into particulates. This can be accomplished by dry mix addition followed by a mechanical process such as extrusion or milling to form the particulates. However, a preferred technique involves comelting of the two materials prior to the particle formation.

In at least the preferred embodiments of the present invention, comelting permits the formation, when the mixture is subsequently cooled, of a solid phase which is crystallographically distinct from either of the individual components. This phase is believed to enhance the inhibition of the solubility of the quaternary antistat organic dispersion inhibitor particle, even when the latter has a size in the range of $10\mu$ to $50\mu$.

The formation of the particulates from the comelt can be carried out in a number of ways. The mixture can be sprayed via a single- or two-fluid pressure nozzle to form droplets of the desired size range, i.e. $50\mu$ to $250\mu$ which are then solidified by cooling and subjected to screening to remove material which is either too coarse or too fine. A tower-prilling technique can also be used to obtain the same result, namely a mixture of substantially spherical droplets having a broad spread of particle sizes about a given mean.

Alternatively a prilling process such as that disclosed in German D.O.S. 2,137,042 and 2,137,043 (both incorporated herein by reference) can be employed. Particulates made in this manner are entirely satisfactory for the purpose of delivering an antistat benefit in accordance with the invention. However, such particulates are less satisfactory from an aesthetic standpoint in that they are visible as a deposit on fabrics which have been removed from the wash liquor but have not been subjected to machine drying. The use of elevated drying temperatures together with the tumbling effect created by the rotary motion of the dryer, serves to soften the particulates and spread them over the fabrics to give the desired antistat benefit and eliminate their aesthetic disadvantage.

Another method of obtaining particulates of the desired size range which are not visible to the naked eye on fabrics removed from the wash solution is as follows. The comelt of quaternary ammonium compound and dispersion inhibitor is solidified and then comminuted to obtain particles which are irregular and angular rather than uniform and spherical in shape. High energy comminution processes such as hammer, rod, and ball mills and air impact mills can be used but preferably a low energy input process is employed which does not result in an appreciable temperature increase of the material being treated. While the theory of the process is not fully understood, it is believed that a low energy comminution process such as grating through a sieve avoids the surface softening or melting associated with processes involving higher energy inputs and thereby minimizes agglomeration of the comminuted material. Any agglomerates which do form are fragile in nature and disintegrate under the subsequent agitated conditions of the wash into individual particles of the desired size range.

Detergent Compositions

The particulate detergent additive products of the present invention may themselves constitute components of laundry detergent compositions of different types, e.g., additive products intended to provide specific performance attributes where added to wash liquors containing conventional detergent formulations or fully developed formulations designed to include the particulate additive as part of the product.

Examples of the first type include mixtures of the particulate additive with other granular materials such as oxygen or chlorine bleaches, peroxy bleach activators, optical brighteners, enzymatic agents, detergent builders, and sequestering agents, antibacterial agents, fabric softeners, and the like. In this type, the percentage by weight of the particulate additive product can vary between very wide limits depending on the number and amount of the other components, but will generally lie within the range of 5 to 95%, preferably 10 to 50% by weight of the composition.

Examples of the second type are those compositions comprising surfactants, detergent builders, suds modifiers, antiredeposition agents, bleaches, etc., which constitute complete heavy-duty laundry products.

In fully developed detergent compositions the particulate product will normally be present in an amount sufficient to provide 1 to 10%, preferably 2 to 5% of the quaternary antistat material in the detergent composition. The remainder of the composition will comprise 1 to 50% by weight, preferably 10 to 25% by weight of a detersive surfactant and approximately 15 to 60%, more preferably 20 to 45% by weight of a detergent builder, together with other conventional detergent ingredients.

Surfactant

From about 1 to about 50% by weight, preferably about 10 to about 25% by weight and most preferably from about 5 to about 20% by weight, of the detergent compositions can comprise an organic surfactant selected from the group consisting of anionic, nonionic, ampholytic, and zwitterionic detergents and mixtures thereof. Examples of organic surfactants of these types are described in U.S. Pat. No. 3,579,454; incorporated herein by reference, column 11, line 45 to column 13, line 64.

Water-soluble salts of the higher fatty acids, i.e., "soaps" are useful as the anionic surfactant herein. This class of surfactants includes ordinary alkali metal soaps such as the sodium, potassium, ammonium, and alkanolammonium salts of higher fatty acids containing from about 8 to about 24 carbon atoms and preferably from about 10 to about 20 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soaps.

Another class of anionic surfactants includes water-soluble salts, particularly the alkali metal, ammonium and alkanolammonium salts, of organic sulfuric reaction products having in their molecular structure an alkyl group containing from about 8 to about 22 carbon atoms and a sulfonic acid or sulfuric acid ester group. (Included in the term "alkyl" is the alkyl portion of acyl groups.) Examples of this group of synthetic surfactants which can be used in the present invention are the sodium and potassium alkyl sulfates, especially those obtained by sulfating the higher alcohols ($C_8$–$C_{18}$ carbon atoms) produced by reducing the glycerides of tallow or coconut oil; and sodium and potassium alkyl benzene sulfonates, in which the alkyl group contains from about 9 to about 15 carbon atoms in straight chain or branched chain configuration, e.g., those of the type described in U.S. Pat. Nos. 2,220,099 and 2,477,383, incorporated herein by reference (especially valuable are linear straight chain alkyl benzene sulfonates in which the average of the alkyl groups is about 11.8 carbon atoms and commonly abbreviated as $C_{11.8}LAS$).

Other preferred detergents for use herein are alkyl ether sulfates. These materials have the formula $RO(C_2H_4O)_xSO_3M$ wherein R is alkyl or alkenyl of about 10 to about 20 carbon atoms, $x$ is 1 to 30, and M is a water-soluble cation such as alkali metal, ammonium, and substituted ammonium. The alkyl ether sulfates useful in the present invention are condensation products of ethylene oxide and monohydric alcohols having about 10 to about 20 carbon atoms. Preferably, R has 14 to 18 carbon atoms. The alcohols can be derived from fats, e.g., coconut oil or tallow, or can be synthetic. Lauryl alcohol and straight chain alcohols derived from tallow are preferred herein. Such alcohols are reacted with 1 to 30, and especially 1 to 6, molar proportions of ethylene oxide and the resulting mixture of molecular species, having, for example, an average of 3 moles of ethylene oxide per mole of alcohol, is sulfated and neutralized.

Specific examples of fat-derived alkyl ether sulfates of the present invention are sodium coconut alkyl ethylene glycol ether sulfate; sodium tallow alkyl trioxyethylene ether sulfate; and sodium tallow alkyl hexaoxyethylene sulfate.

Examples of alkyl ether sulfates of synthetic origin in which the starting alcohol is a narrow-cut olefin feed stock include sodium $C_{14-15}$ alkyl trioxyethylene ether sulfate and $C_{15-16}$ alkyl trioxyethylene ether sulfate.

Other anionic surfactant compounds herein include the sodium alkyl glyceryl ether sulfonates, especially those ethers of higher alcohols derived from tallow and coconut oil; sodium coconut oil fatty acid monoglyceride sulfonates and sulfates; and sodium or potassium salts of alkyl phenol ethylene oxide ether sulfate containing about 1 to about 10 units of ethylene oxide per molecule and wherein the alkyl groups contain from about 8 to about 12 carbon atoms.

Other useful anionic surfactants herein include the water-soluble salts of esters of α-sulfonated fatty acids containing from about 6 to 20 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkene sulfonates containing from about 10 to 20 carbon atoms in the alkane group; and β-alkyloxy alkane sulfonates containing from about 1 to 3 carbon atoms in the alkyl group and from about 8 to 20 carbon atoms in the alkane moiety.

Other preferred detergents utilizable herein are olefin sulfonates having about 12 to about 24 carbon atoms. The term "olefin sulfonates" is used herein to mean compounds which can be produced by the sulfonation of α-olefins by means of uncomplexed sulfur trioxide, followed by neutralization of the acid reaction mixture in conditions such that any sultones which have been formed in the reaction are hydrolyzed to give the corresponding hydroxy-alkane sulfonates. The sulfur trioxide can be liquid or gaseous, and is usually, but not necessarily, diluted by inert diluents, for example by liquid $SO_2$, chlorinated hydrocarbons, etc., when used in the liquid form, or by air, nitrogen, gaseous $SO_2$, etc., when used in the gaseous form.

The α-olefins from which the olefin sulfonates are derived are mono-olefins having 12 to 24 carbon atoms, preferably 14 to 16 carbon atoms. Preferably they are straight chain olefins. Examples of suitable 1-olefins include 1-dodecane, 1-tetradecene, 1-hexadecene, 1-octadecene, 1-eicosene, and 1-tetracosene.

In addition to the true alkene sulfonates and a portion of hydroxy-alkane sulfonates, the olefin sulfonates can contain minor amounts of other materials, such as alkene disulfonates depending upon the reaction conditions, proportion of reactants, the nature of the starting olefins and impurities in the olefin stock and side reactions during the sulfonation process.

A specific anionic detergent which is useful in the present invention is described more fully in the U.S. Pat. No. 3,332,880 of Phillip F. Pflaumer and Adrian Kessler, issued July 25, 1967, titled "Detergent Composition", the disclosure of which is incorporated herein by reference.

Preferred nonionic surfactants useful in the present invention are those obtained by the condensation of one to twelve ethylene oxide moieties with a $C_{10}$–$C_{18}$ aliphatic alcohol. The alcohol may be completely linear as occurs in materials derived from natural feedstocks such as vegetable oils and animal fats, or may be slightly branched as occurs in petroleum-derived alcohols made by oxo-type synthesis. Particularly preferred materials are $C_{14}$–$C_{15}$ alcohol condensed with an average of seven ethylene oxide groups, $C_{12}$–$C_{13}$ alcohol condensed with an average of about four ethylene oxide groups and then subjected to stripping to remove unethoxylated and low ethoxylated materials, to leave an ethoxylate having a mean of 4.5 ethylene oxide groups.

Preferred zwitterionic materials are derivatives of quaternary ammonium compounds containing an aliphatic straight chain group of 14-18 carbon atoms and a sulfate or sulfonate anionic solubilizing group. Specific examples include 3-(N,N-dimethyl-N-hexadecyl ammonio-2-hydroxypropane-1-sulfonate; 3-(N,N-dimethyl-N-tallowyl ammonio)-2-hydroxypropane-1-sulfonate; 3-(N,N-dimethyl-N-tetradecyl ammonio)-propane-1-sulfonate; and 6-(N,N-dimethyl-N-hexadecylammonio)hexanoate.

Detergency Builders

The detergent compositions of the instant invention can also contain a detergent builder in an amount from about 5 to 95% by weight, preferably from about 15 to 60% by weight of the composition. Useful builders herein include any of the conventional inorganic and organic water-soluble builder salts as well as various water-insoluble and so-called "seeded" builders. In the present compositions these water-soluble builder salts serve to maintain the pH of the laundry solution in the range of from about 7 to about 12, preferably from about 8 to about 11. Furthermore, these builder salts enhance the fabric cleaning performance of the overall compositions while at the same time they serve to suspend particulate soil released from the surface of the fabrics and prevent its redeposition on the fabric surfaces. Additionally, in preferred detergent compositions that contain certain smectite clays as fabric softening agents, polyanionic builder salts have been found to cause these smectite-type clays to be readily and homogeneously dispersed throughout the aqueous laundering medium with a minimum of agitation. The homogeneity of the clay dispersion is necessary for the clay to function effectively as a fabric softener, while the ready dispersability allows granular detergent compositions to be formulated.

Suitable detergent builder salts useful herein can be of the polyvalent inorganic and polyvalent organic types, or mixtures thereof. Non-limiting examples of suitable water-soluble, inorganic alkaline detergent builder salts include the alkali metal carbonates, borates, phosphates, polyphosphates, tripolyphosphates, bicarbonates, silicates, and sulfates. Specific examples of such salts include the sodium and potassium tetraborates, bicarbonates, carbonates, tripolyphosphates, pyrophosphates, and hexametaphosphates.

Examples of suitable organic alkaline detergency builder salts are: (1) water-soluble amino polyacetates, e.g., sodium and potassium ethylenediaminetetraacetates, nitrilotriacetates, and N-(2-hydroxyethyl)nitrilodiacetates; (2) water-soluble salts of phytic acid, e.g., sodium and potassium phytates; (3) water-soluble polyphosphonates, including, sodium, potassium and lithium salts of ethane-1-hydroxy-1,1-diphosphonic acid; sodium, potassium, and lithium salts of methylenediphosphonic acid and the like.

Additional organic builder salts useful herein include the polycarboxylate materials described in U.S. Pat. No. 2,264,103, including the water-soluble alkali metal salts of mellitic acid. The water-soluble salts of polycarboxylate polymers and copolymers such as are described in U.S. Pat. No. 3,308,067, incorporated herein by reference, are also suitable herein. It is to be understood that while the alkali metal salts of the foregoing inorganic and organic polyvalent anionic builder salts are preferred for use herein from an economic standpoint, the ammonium, alkanolammonium, e.g., triethanolammonium, diethanolammonium, and the like, water-soluble salts of any of the foregoing builder anions are useful herein.

Mixtures of organic and/or inorganic builders can be used herein. One such mixture of builders is disclosed in Canadian Pat. No. 755,038, e.g., a ternary mixture of sodium tripolyphosphate, trisodium nitrilotriacetate, and trisodium ethane-1-hydroxy-1,1-diphosphonate.

A further class of builder salts is the insoluble alumino silicate type which functions by cation exchange to remove polyvalent mineral hardness and heavy metal ions from solution. A preferred builder of this type has the formulation $Na_z(AlO_2)_z(SiO_2)_y \cdot x H_2O$ wherein $z$ and $y$ are integers of at least 6, the molar ratio of $z$ to $y$ is in the range from 1.0 to about 0.5 and $x$ is an integer from about 15 to about 264. Compositions incorporating builder salts of this type form the subject of the commonly assigned Application of John Michael Corkill, Bryan L. Madison, and Michael E. Burns, Ser. No. 450,266 filed Mar. 11, 1974 and entitled "Detergent", the disclosure of which is incorporated herein by reference.

Another type of detergency builder material useful in the present compositions and processes comprises a water-soluble material capable of forming a water-insoluble reaction product with water hardness cations in combination with a crystallization seed which is capable of providing growth sites for said reaction product. Such "seeded builder" compositions are fully disclosed in the copending application of Benjamin, Ser. No. 248,546, filed Apr. 28, 1972 (now abandoned), the disclosures of which are incorporated herein by reference.

More particularly, the seeded builders useful herein comprise a crystallization seed having a maximum particle dimension of less than 20 microns, preferably a particle diameter of from about 0.01 micron to about 1 micron, in combination with a material capable of forming a water-insoluble reaction product with free metal ions.

Many builder materials, e.g., the water-soluble carbonate salts, precipitate water hardness cations, thereby performing a builder function. Unfortunately, many of the precipitating builders used in laundry compositions do not reduce the free metal ion content of laundry baths quickly, and such builders only compete with the organic detergent and the soil for the free metal ions. The result is that while some of the free metal ions are removed from the solution, some ions do react with the organic detergent and the soil, thereby decreasing the detersive action. The use of the crystallization seed quickens the rate of precipitation of the metal cations, thereby removing the hardness before it can adversely affect detergency performance.

By using a material capable of forming a water-insoluble product with free metal ions in combination with a crystallization seed, the combined ($Ca^{++}$ and $Mg^{++}$) free metal ion concentration of an aqueous laundering liquor can be reduced to less than 0.5 grains of hardness within about 120 seconds. In fact, the preferred seeded builders can reduce the free metal hardness to less than 0.1 grains/gallon within about 30 seconds.

Preferred seeded builders consist of: a water-soluble material capable of forming a reaction product having a solubility in water of less than about $1.4 \times 10^{-2}$ wt.% (at 25°C) with divalent and polyvalent metal ions such as calcium, magnesium and iron; and a crystallization seed (0.001–20 micron diameter) which comprises a material which will not completely dissolve in water within 120 seconds at 25°C.

Specific examples of materials capable of forming the water-insoluble reaction product include the water-soluble salts of carbonates, bicarbonates, sesquicarbonates, silicates, aluminates and oxalates. The alkali metal, especially sodium, salts of the foregoing materials are preferred for convenience and economy.

The crystallization seed employed in such seeded builders is preferably selected from the group consisting of calcium carbonate; calcium and magnesium oxalates; barium sulfate; calcium, magnesium and aluminum silicates; calcium and magnesium oxides, calcium and magnesium salts of fatty acids having 12 to 22 carbon atoms; calcium and magnesium hydroxides; calcium fluoride; and barium carbonate. Specific examples of such seeded builder mixtures comprise: 3:1 wt. mixtures of sodium carbonate and calcium carbonate having a 5 micron particle diameter; 2.7:1 wt. mixtures of sodium sesquicarbonate and calcium carbonate having a particle diameter of 0.5 microns, 20:1 wt. mixtures of sodium sesquicarbonate and calcium hydroxide having a particle diameter of 0.01 micron; and a 3:3:1 wt. mixture of sodium carbonate, sodium aluminate and calcium oxide having a particle diameter of 5 microns.

A seeded builder comprising a mixture of sodium carbonate and calcium carbonate is especially preferred herein. A highly preferred seeded builder comprises a 30:1 to 5:1 (wt. $Na_2CO_3:CaCO_3$) mixture of sodium carbonate and calcium carbonate wherein the calcium carbonate has an average particle diameter from 0.01 micron to 5 microns.

Another type of builder useful herein includes various substantially water-insoluble materials which are capable of reducing the hardness content of laundering liquors, e.g., by ion-exchange processes. Examples of such builder materials include the phosphorylated cloths disclosed in U.S. Pat. No. 3,424,545 to Bauman issued Jan. 28, 1969, incorporated herein by reference.

Clay Compounds

A valuable optional ingredient of the present compositions consists of particular smectite clay materials, namely sodium and calcium montmorillonites, sodium saponites, and sodium hectorites. These smectite clays are present in the additive compositions of this invention at levels from about 5 to about 90%, preferably from 8 to 75% by weight. In the built detergent composition embodiments of this invention, the smectite clay is used in an amount from about 1 to about 50%, preferably from about 5 to about 25% by weight. The clays used herein are "impalpable", i.e., have a particle size which cannot be perceived tactilely. Impalpable clays have particle sizes below about 50 microns; the clays used herein have a particle size range of from about 5 microns to about 50 microns.

The clay minerals can be described as expandable, three-layer clays, i.e., alumino-silicates and magnesium silicates, having an ion exchange capacity of at least 50 meq/100 g. of clay and preferably at least 60 meq/100 g. of clay. The term "expandable" as used to describe clays relates to the ability of the layered clay structure to be swollen, or expanded, on contact with water. The three-layer expandable clays used herein are those materials classified geologically as smectites.

There are two distinct classes of smectite clays that can be broadly differentiated on the basis of the numbers of octahedral metal-oxygen arrangements in the central layer for a given number of silicon-oxygen atoms in the outer layers. The dioctahedral minerals are primarily trivalent metal ion-based clays and are comprised of the prototype pyrophyllite and the members montmorillonite $(OH)_4Si_{8-y}Al_y(Al_{4-x}Mg_x)O_{20}$, nontronite $(OH)_4Si_{8-y}Al_y(Al_{4-x}Fe_x)O_{20}$, and volchonskoite $(OH)_4Si_{8-y}Al_y(Al_{4-x}Cr_x)O_{20}$, where $x$ has a value of from 0 to about 4.0 and $y$ has a value of from 0 to about 2.0. Of these only montmorillonites having exchange capacities greater than 50 meq/100 g. are suitable for the present invention and provide fabric softening benefits.

The trioctahedral minerals are primarily divalent metal ion based and comprise the prototype talc and the members hectorite $(OH)_4Si_{8-y}Al_y(Mg_{6-x}Li_x)O_{20}$, saponite $(OH)_4(Si_{8-y}Al_y)(Mg_{6-x}Al_x)O_{20}$, sauconite $(OH)_4Si_{8-y}Al_y(Zn_{6-x}Al_x)O_{20}$, vermiculite $(OH)_4Si_{8-y}Al_y(Mg_{6-x}Fe_x)O_{20}$, wherein $y$ has a value of 0 to about 2.0 and $x$ has a value of 0 to about 6.0. Hectorite and saponite are the only minerals in this class that are of value in the present invention, the fabric softening performance being related to the type of exchangeable cation as well as to the exchange capacity. It is to be recognized that the range of the water of hydration in the above formulas can vary with the processing to which the clay has been subjected. This is immaterial to the use of the smectite clays in the present invention in that the expandable characteristics of the hydrated clays are dictated by the silicate lattice structure.

As noted hereinabove, the clays employed in the compositions of the instant invention contain cationic counterions such as protons, sodium ions, potassium ions, calcium ions, and lithium ions. It is customary to distinguish between clays on the basis of one cation predominantly or exclusively absorbed. For example, a sodium clay is one in which the absorbed cation is predominantly sodium. Such absorbed cations can become involved in exchange reactions with cations present in aqueous solutions. A typical exchange reaction involving a smectite-type clay is expressed by the following equation: smectite clay (Na) + $\rightleftharpoons$ smectite clay ($NH_4$) + NaOH Since the foregoing equilibrium reaction, one equivalent weight of ammonium ion replaces an equivalent weight of sodium, it is customary to measure cation exchange capacity (sometimes termed "base exchange capacity") in terms of milli-equivalents per 100 g. of clay (meq/100 g.). The cation exchange capacity of clays can be measured in several ways, including by electrodialysis, by exchange with ammonium ion followed by titration or by a methylene blue procedure, all as fully set forth in Grimshaw, "The Chemistry and Physics of Clays", pp. 264– 265, Interscience (1971). The cation exchange capacity of a clay mineral relates to such factors as the expandable properties of the clay, the charge of the clay, which, in turn, is determined at least in part by the lattice structure, and the like. The ion exchange capacity of clays varies widely in the range from about 2 meq/100 g. of kaolinites to about 150 meq/100 g., and greater, for certain smectite clays. Illite clays although having a three layer structure, are of a non-expanding lattice type and have an ion exchange capacity somewhere in the lower portion of the range, i.e., around 26 meq/100 g. for an average illite clay. Attapulgites, another class of clay minerals, have a spicular (i.e. needle-like) crystalline form with a low cation exchange capacity (25–30 meq/100 g.). Their structure is composed of chains of silica tetrahedrons linked together by octahedral groups of oxygens and hydroxyls containing Al and Mg atoms.

It has been determined that illite, attapulgite, and kaolinite clays, with their relatively low ion exchange capacities, are not useful in the instant compositions. Indeed, illite and kaolinite clays constitute a major component of clay soils and, as noted above, are removed from fabric surfaces by means of the instant compositions. However the alkali metal montmorillonites, saponites, and hectorites, and certain alkaline earth metal varieties of these minerals such as calcium montmorillonites have been found to show useful fabric softening benefits when incorporated in compositions in accordance with the present invention.

Specific non-limiting examples of such fabric softening smectite clay minerals are:

Sodium Montmorillonite

Brock
Volclay BC
Gelwhite GP
Thixo-Jel No. 1
Ben-A-Gel

Sodium Hectorite

Veegum F
Laponite SP

Sodium Saponite

Barasym NAS 100

Calcium Montmorillonite

Soft Clark
Gelwhite L

Lithium Hectorite

Barasym LIH 200

Accordingly, smectite clays useful herein can be characterized as montmorillonite, hectorite, and saponite clay minerals having an ion exchange capacity of at least about 50 meq/100 g. and preferably at least 60 meq/100 g.

While not intending to be limited by theory, it appears that the advantageous softening (and potentially dye scavenging, etc.) benefits of the instant compositions are ascribable to the physical characteristics and ion exchange properties of the clay minerals used therein. Furthermore, the unique physical and electrochemical properties of the smectite clays apparently cause their interaction with, and dispersion by, the poly-anionic builder salts used in the instant compositions. Thus, it has now been found that, rather than agglomerating to form viscous gels when contacted by water, the smectite clays used herein can be added to aqueous laundry baths in granular compositions containing poly-anionic detergency builders of the type disclosed herein to yield homogeneous, clay suspensions. The problems of gelling and agglomeration usually encountered when smectite clays are added to aqueous media in solid form are alleviated by the presence of the builder. Apparently, the negative electrical charges on the builder anions serve to repulse the clay particles, thereby providing the desired homogeneous clay dispersion and preventing agglomeration. Whatever the reason for the advantageous co-action of the detergency builder and smectite clays used herein, the combination of poly-anionic detergency builders with the specific aluminum-containing and magnesium-containing smectites, provides a means whereby such smectite clay minerals can be added in solid form to surfactant-containing media so as to give the homogeneous clay dispersion required for effective fabric softening performance.

Most of the smectite clays useful in the compositions herein are commercially available under various tradenames, for example, Thixo-Jel No. 1 and Gelwhite GP from Georgia Kaolin Co., Elizabeth, New Jersey; Volclay BC and Volclay No. 325, from American Colloid Co., Skokie, Illinois; and Veegum F, from R. T. Vanderbilt. It is to be recognized that such smectite minerals obtained under the foregoing tradenames can comprise mixtures of the various discrete mineral entities. Such mixtures of the smectite minerals are suitable for use herein.

Within the classes of montmorillonite, hectorite, and saponite clay minerals having a cation exchange capacity of at least about 50 meq/100 g, certain clays are preferred for fabric softening purposes. For example, Gelwhite GP is an extremely white form of smectite clay and is therefore preferred when formulating white granular detergent compositions. Volclay BC, which is a smectite clay mineral containing at least 3% of iron (expressed as $Fe_2O_3$) in the crystal lattice, and which has a very high ion exchange capacity, is one of the most efficient and effective clays for use in laundry compositons and is preferred from the standpoint of product performance. On the other hand, certain smectite clays marketed under the name "bentonite" are sufficiently contaminated by other silicate minerals, as evidenced by a low colloid content ($\approx 50\%$) that their ion exchange capacity falls below the requisite range, and such clays are of no use in the instant compositions.

Bentonite, in fact, is a rock type originating from volcanic ash and contains montmorillonite (one of the smectite clays) as its principal clay component. The Table shows that materials commercially available under the name bentonite can have a wide range of cation exchange capacities and fabric softening performance.

| BENTONITE | SUPPLIER | EXCHANGE CAPACITY meq/100 g | SOFTENING ABILITY |
|---|---|---|---|
| Brock | Georgia Kaolin Co. USA | 63 | Good |
| Soft Clark | Georgia Kaolin Co. USA | 84 | Good |
| Bentolite L | Georgia Kaolin Co. USA | 68 | Fair – Good |
| Clarolite T-60 | Georgia Kaolin Co. USA | 61 | Fair |
| Granulare Naturale Bianco | Seven C. Milan Italy | 23 | Fair – Poor |
| Thixo--Jel No. 4 | Georgia Kaolin Co. USA | 55 | Poor* |
| Granular Naturale Normale | Seven C. Milan Italy | 19 | Poor |
| Clarsol FB 5 | Ceca Paris France | 12 | Poor |
| PDL 1740 | Georgia Kaolin Co. USA | 26 | None |
| Versuchs Product FFI | Sud-Chemie Munich Germany | 26 | None |

*Low colloid content ($\approx 50\%$)

Appropriate clay minerals for use herein can be selected by virtue of the fact that smectites exhibit a true 14A x-ray diffraction pattern. This characteristic pattern, taken in combination with exchange capacity measurements performed in the manner noted above, provides a basis for selecting particular smectite-type minerals for use in the compositions disclosed herein.

The smectite clay materials useful in the present invention are hydrophilic in nature, i.e. they display swelling characteristics in aqueous media. Conversely they do not swell in nonaqueous or predominantly nonaqueous systems, including those incorporating the smectite clay minerals described hereinbefore should restrict the nonionic content of the surfactant system to less than 33% by weight of the total surfactant, preferably less than 25%.

Other Optional Components

Another optional ingredient that may be incorporated is an enzyme for removal of protein-based or carbohydrate-based stains. Enzymes for removing protein-based stains are proteolytic in nature such as those sold under the trade names "Alcalase" and "Esterase" by Novo Industries A/S Denmark or under the trade names "Maxatase" and "AZ Protease" by Gist-Brocades N.V. The Netherlands. These materials are normally incorporated at levels of up to 1% by weight, preferably 0.25 to 0.75% by weight, and are preferably coated or prilled with inert additives to minimize dust formation and improve storage stabililty. A wide range of enzyme materials and means for their incorporation into synthetic detergent granules is disclosed in U.S. Pat. No. 3,553,139 issued on Jan. 5, 1971, to McCarty, Roald, DeOude, Blomeyer, and Cracco which disclosure is hereby incorporated by reference.

A further ingredient that may be incorporated to improve product performance is a bleaching agent of the halogen or oxygen-containing type. Examples of the hypohalite bleach type include trichloro isocyanuric acid and the sodium and potassium dichloroisocyanurates and N-chloro and N-bromo alkane sulphonamides. Such materials are normally added to 0.5–10% by weight of the finished product, preferably 1–5% by weight.

Examples of oxygen-containing bleaches include sodium perborate, sodium percarbonate, and potassium nonopersulphate that are incorporated at levels of 5–30%, preferably 10–25% by weight of the final product. The inclusion of organic bleach activators such as phthalic anhydride, tetra acetyl ethylene diamine, tetra acetyl methylene diamine or tetra acetyl glycouril lead to the in situ production during the washing process of the corresponding organic peroxy acids which have enhanced low temperature bleaching performance. Activators of this type are normally used with sodium perborate, at usage levels of 5–15% by weight of the final product.

Materials to boost or modify the sudsing pattern of the compositions of the present invention may also be included. Examples of suds boosters include coconut and tallow mono- and di-alkanolamides, particularly ethanolamides and $C_{12-15}$ alkyl di-lower alkyl amine oxides. Typical suds depressors include long chain fatty acids such as those disclosed in U.S. Pat. No. 2,954,347 issued Sept. 27, 1960, to Wayne St. John and combinations of certain nonionics therewith as disclosed in U.S. Pat. No. 2,954,348 issued Sept. 27, 1960, to Eugene Schwoeppe, both disclosures being incorporated herein by reference.

Other optional ingredients in granular products include hydrotropes and anticaking additives such as salts of lower alkyaryl sulphonic acids, salts of α-sulphosuccinic acid, and α-sulphobenzoic acid, and urea, normally utilized at levels of 0.5 to 5% by weight of the final product, preferably at levels of 1–3% by weight. $C_{12}$–$C_{18}$ alkyl acid phosphates and their condensation products with ethylene oxide may also be incorporated at similar levels for control of crutcher mix viscosity. Antiredeposition agents such as carboxymethyl cellulose, hydroxyethyl cellulose, and their derivatives may also be incorporated.

Advantageously, ingredients may also be included to minimize the wrinkling of fabrics that occurs during conventional drying processes. Detergent products incorporating starch and other particulate materials useful as fabric conditioning agents are disclosed in Belgian Pat. No. 811,082 published Aug. 16, 1974, and incorporated herein by reference. A non-limiting example of such a fabric conditioning agent is corn starch, which can be added at a level of 0.1–5.0% by weight of the composition, preferably 0.25–1.0%.

Anti-tarnish and anti-corrosion agents, perfume and colour may also be included, the last ingredient being conveniently added either as a general colour or in the form of a speckle applied to a separate granule fraction of the entire formulation or to a granulate of one or more of the ingredients.

The pH of detergent formulations in accordance with the present invention can lie anywhere within the range 5–12 but is preferably chosen to fall within the range 8.0–10.5 as this provides a slight particulate soil removal benefit on synthetic fabrics. However, the use of specific optional components such as enzymes may require the selection of a product pH that will permit optimum functioning of the component concerned.

Composition Usage

As previously stated, the particulate additive products can be conveniently employed to supplement an aqueous liquor containing a conventional laundry detergent composition. Levels of product addition to give from 10 ppm to 250 ppm, preferably from 40 to 100 ppm of antistatic agent in solution are generally used. Where the additive forms part of a combination product providing, for example, presoak capability the formulation will typically comprise about 1 to 30%, preferably 5 to 20% by weight of the particulate antistat additive product, from 10 to 80%, preferably 20 to 60% of a detergency builder, from about 5 to 45%, preferably 10 to 30% by weight of a bleach, and from 0.05 to 2.0%, preferably 0.1 to 1.0% by weight of a detergency enzyme. Compositions of this type are designed to deliver approximately 100–500 ppm builder concentration to a 5–8 gallon soak solution when employed at the ½ to 1½ cup usage level which is common practice in household laundering processes.

Fully formulated detergent compositions, in addition to providing the solution concentration of detergency builder specified above, also provide a surfactant concentration in the range 50–500 ppm, more preferably 150–250 ppm in a 5–8 gallon wash solution. Surfactant level in product will normally range from 1 to 50%, preferably 10 to 25% by weight of the composition.

In use, the detergent additive product may be in contact with the fabrics for 1 to 24 hours if employed as, or as part of, a presoak treatment following which the wash liquor is removed and replaced by fresh water and detergent, and the fabrics are laundered.

When used directly in the laundering operation either as a separate additive product or as part of a fully formulated detergent composition, the solution containing the suspended particulate antistat additive is in contact with the fabrics for 10 to 45 minutes, following which, the fabrics are rinsed and spun dry before being subjected to temperatures of 125°–200°F in a conventional rotary dryer. During the drying process, the particulate antistat product softens as the fabrics approach the dryer air temperature, and the tumbling action of the dryer causes the individual particles of material to "crayon" or smear, thus distributing the quaternary antistat over the surface of the fabrics and minimizing the build-up of static charges on the fabrics.

The following examples illustrate the compositions and processes of the invention but are not intended to be limiting thereof:

EXAMPLE I

A laundry wash additive composition was prepared as follows:

| Ingredient | Weight Percent |
|---|---|
| Dimethyl di hydrogenated tallow ammonium chloride* | 57 |
| Tallow alcohol | 43 |
| | 100 |

*In the form of a 95% active powder.

The dimethyl, dihydrogenated tallow ammonium chloride (DTDMAC) and tallow alcohol were melted together to form a clear solution at 180°F. This molten solution was poured into trays and allowed to solidify at room temperature into sheets. The sheets were then reduced to particles having a size in the range 200–400$\mu$ by grating on a 20 mesh woven wire screen and collecting the material that passed a 35 Tyler mesh sieve and was retained on a 65 Tyler mesh sieve. The melting point of the DTDMAC/tallow alcohol mixture was found to be 165°F. In addition, the laundry additive composition was subjected to x-ray diffraction analysis and compared with pure tallow alcohol and the 95% active DTDMAC powder. The combined DTDMAC/tallow alcohol was found to have a crystalline structure differing from both tallow alcohol and DTDMAC.

Seven parts of the particulate additive product were then incorporated into 93 parts of a granular detergent resulting the following composition:

| Base Detergent Composition | |
|---|---|
| Ingredient | Weight Percent |
| $C_{11.8}$ alkylbenzene sulfonate | 10.0 |
| Sodium tallow alkyl sulfate | 5.5 |
| Sodium $C_{14}$–$C_{16}$ alkyl triethoxy sulfate | 5.5 |
| Sodium tripolyphosphate | 25.0 |
| Sodium silicate | 15.0 |
| Sodium sulfate | 25.0 |
| Water | 5.0 |
| Miscellaneous (perfumes, brighteners, etc.) | 2.0 |
| | 93.0 |
| Particulate additive | 7.0 |
| | 100.0 |

This product was added to a domestic washing machine filled with 17 gallons of water to give a wash liquor containing 0.12 weight percent of the above detergent composition.

A wash load of 33 items consisting of several different types of fabrics (cotton, polyamide, polyester, and cotton/polyester blend) was washed in this wash liquor, after which the fabrics were rinsed, spun dried, and finally dried in a domestic clothes dryer. After drying for 50 minutes with air heated to between 150°F and 180°F, the clothes were removed from the dryer and found to be not only clean and dry but also free of static, with no fabrics clinging to each other. In a separate wash of the same load of fabrics by the same procedure using the same detergent composition but without the DTDMAC/tallow alcohol laundry additive, static was generated by the tumbling action of the dryer resulting in 6 of the 33 items clinging to each other. The cotton terry cloth items washed in the above two washes were compared and judged to feel softer when washed with detergent plus the DTDMAC/tallow alcohol additive than when washed with the detergent alone.

EXAMPLE II

A laundry wash additive composition of the following formula was made by the same procedure used in Example I:

| Ingredient | Weight Percent |
|---|---|
| Methyl, 1-alkylamidoethyl, 2-alkyl imidazolinium methosulfate* | 50 |
| Tallow alcohol | 50 |
| | 100 |

*A commercially availablie antistatic agent sold by Ashland Chemical Corporation under the trade name Varisoft 475 comprising 85% active, 15% isopropanol.

A wash load consisting of four fabric swatches of cotton and two each of polyamide, polyester, and cotton/polyester blend was subjected to a 10 minute wash in 105°F water of hardness 7 grains/U.S. gallon (Ca:Mg = 3:1) using a miniature washer. The wash liquor contained 125 ppm of the above particulate antistat additive and 930 ppm of the base detergent composition used in Example I. After drying in a miniature dryer, the bundle of dried fabrics was placed in a Faraday cage, and the voltage was read. Individual fabrics were then removed from the bundle in the Faraday cage in random order noting the change in voltage as each item was removed. The amount of static generated in the dryer was determined and expressed as the sum of the absolute value of the voltage changes for all the fabrics per square yard of fabric area. Using this technique, the static generated in the above washing and drying was found to be 0.3 volts per square yard. The same bundle washed by the same procedure using the same detergent composition but without the imidazolinium/tallow alcohol additive was found to generate 7.1 volts per square yard when dried in the dryer. In addition, after drying, none of the swatches washed with the imidazolinium/tallow alcohol additive were clinging, but several of the swatches washed in detergent alone were clinging to each other.

EXAMPLE III

A laundry wash additive composition of the following formula was made by the same procedure used in Example I:

| Ingredient | Weight Percent |
|---|---|
| Dimethyl dihydrogenated tallow ammonium chloride | 33 |
| Paraffin wax* | 67 |
| | 100 |

*Parowax, a commercially available paraffin wax sold by Boron Laboratories, Cleveland, Ohio having a melting point of 130°F.

DTDMAC/paraffin particles of a size that pass a 35 Tyler mesh screen and are retained on a 50 Tyler mesh screen were added to a wash to provide 120 ppm of the additive in solution together with 930 ppm of the base detergent composition of Example I. The procedure of Example II was repeated using the same bundle of fabrics as in that Example. The static generated in the miniature dryer was found to be 2.1 volts per square yard.

EXAMPLE IV

A laundry pre-soak and detergent additive composition is made up as follows:

| Ingredient | Weight Percent |
|---|---|
| Dimethyl di hydrogenated tallow ammonium chloride | 2.5 |
| Sorbitan ester[1] | 10.0 |
| Sodium tripolyphosphate | 31.4 |
| Sodium perborate .4 $H_2O$ | 20.0 |
| Borax | 7.5 |
| Tallow ethoxylate[2] | 3.8 |
| Spray-dried granules[3] | 24.0 |
| Enzyme[4] | 0.3 |
| Brightener, dye, perfume, and water | Balance |

[1]A mixture of $C_{16}$–$C_{22}$ alkyl sorbitan esters, the major portion comprising tri- and tetra-esters.
[2]Tallow alcohol condensed with an average of 22 ethylene oxide groups.
[3]Comprising, in spray-dried granule form: 10% linear alkyl benzene sulfonate, 20% sodium carbonate, 20% sodium silicate, and balance sodium sulfate and water.
[4]Alcalase (Novo) and protease (Miles' Laboratories).

The quaternary antistat/dispersion inhibitor is prepared by co-melting the sorbitan esters and quaternary to provide a substantially homogeneous melt. The melt is sprayed onto a moving belt, whereupon it solidifies. The melt is removed from the belt by a doctor blade in the form of flakes. The flakes are pulverized in a mill and sieved through a 60 mesh sieve to give a particulate additive for use in the composition.

This additive is then dry-mixed with the remaining ingredients until a homogeneous, granular product is secured.

One-half a cup of the total composition is used to pre-soak soiled fabrics for a period of three hours. Thereafter, the fabrics are laundered using a commercial anionic detergent, rinsed, spun-dried, and finally dried in an automatic clothes dryer, with tumbling and venting, at a temperature which varies over a range of 135°F to 170°F for a period of 60 minutes. The fabrics treated in this manner are dry and clean, and exhibit an especially desirable, soft, and anti-static finish. Moreover, the condition of the fabrics is noteworthy inasmuch as they are quite easy to iron.

In the composition of Example IV, the sodium tripolyphosphate is replaced by an equivalent amount of sodium citrate, sodium nitrilotriacetate, hydrated zeolite A, and a 5:1 weight mixture of sodium carbonate and calcium carbonate crystals having an average particle size of 1 $\mu$ as the builder component, respectively, and equivalent results are secured.

What is claimed is:

1. A particulate detergent additive product adapted to prevent static buildup on textiles when applied thereto from a detergent wash liquor, said particulate product being an intimate mixture of:

A. 80–20% by weight of the particles of quaternary ammonium compounds of formula $[R_1R_2R_3R_4N]^+Y^-$, wherein at least one of $R_1R_2R_3$ and $R_4$ is an organic radical containing a group selected from a $C_{16}$–$C_{22}$ aliphatic radical, or an alkyl phenyl or alkyl benzyl radical having 10 to 16 carbon atoms in the alkyl chain, the remaining group or groups being selected from $C_1$–$C_4$ alkyl, $C_2$–$C_4$ hydroxyalkyl, and cyclic structures in which the nitrogen atom forms part of the ring, Y constituting an anionic radical selected from the group consisting of hydroxide halide, sulphate and methylsulfate ions and phosphate ions, B. 20–80% by weight of the particles of a dispersion inhibitor, being a solid organic material having a solubility in water of 50 ppm max at 25°C and a softening point in the range of 100°F to 200°F, said material being selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof, substantially all of the individual particles having a size within the range $10\mu$ to $500\mu$, said product having a solubility in water of 50 ppm max at 25°C and having a softening point in the range 100°F to 200°F.

2. A particulate detergent additive according to claim 1 wherein substantially all of the particles have a size within the range $25\mu$ to $250\mu$.

3. A particulate detergent additive according to claim 1 wherein substantially all of the particles have a size within the range $50\mu$ to $100\mu$.

4. A particulate detergent additive product according to claim 1 wherein the particles have a softening point in the range 150°F to 175°F.

5. A particulate detergent additive product according to claim 1 wherein the weight ratio of quaternary ammonium compound to dispersion inhibitor lies in the range of 1:1 to 4:1.

6. A particulate detergent additive product according to claim 1 wherein the weight ratio of quaternary ammonium compound to dispersion inhibitor lies in the range of 3:2 to 2:1.

7. A particulate detergent additive product according to claim 2 wherein the intimate mixture is formed of a solidified comelt of the quaternary ammonium compound and the dispersion inhibitor.

8. A particulate detergent additive product according to claim 7 wherein the mixture of the quaternary ammonium compound and dispersion inhibitor constitutes a discrete solid phase, distinguishable from the phases of the respective components.

9. A particulate detergent additive product according to claim 1 wherein the quaternary ammonium compound is selected from ditallow dimethyl ammonium chloride and ditallow dimethyl ammonium methyl sulfate.

10. A particulate detergent additive product according to claim 1 wherein the dispersion inhibitor is tallow alcohol.

11. A particulate detergent additive product according to claim 1 wherein the dispersion inhibitor is a $C_{10}$–$C_{22}$ alkyl sorbitan ester.

12. A particulate detergent additive product according to claim 11 wherein the dispersion inhibitor is a mixture of $C_{10}$–$C_{22}$ alkyl sorbitan esters, the major components of which is one or more esters selected from the group consisting of sorbitan trilaurate, sorbitan trimyristate, sorbitan tripalmitate, sorbitan tristearate, sorbitan tetralaurate, sorbitan tetramyristate, sorbitan tetrapalmitate, sorbitan tetrastearate, and mixtures thereof.

13. A detergent composition adapted to prevent static buildup on textiles laundered therewith consisting essentially of:

1. 50 to 90% by weight of the composition of a surfactant selected from the group consisting of anionic, nonionic, and zwitterionic surfactants, 2. 10 to 50% by weight of the composition of a particulate combination comprising an intimate mixture consisting essentially of:

A. 80 to 20% by weight of the particles of quaternary ammonium compounds of formula $[R_1R_2R_3R_4N]^+Y^-$, wherein at least one of $R_1R_2R_3$ and $R_4$ is an organic radical containing a group selected from a $C_{16}$–$C_{22}$ aliphatic radical, or an alkyl phenyl or alkyl benzyl radical having 10 to 16 carbon atoms in the alkyl chain, the remaining group or groups being selected from $C_1$–$C_4$ alkyl, $C_2$–$C_4$ hydroxyalkyl, and cyclic structures in which the nitrogen atom forms part of the ring, Y constituting an anionic radical selected from the group consisting of halide and methosulfate ions, B. 20 to 80% by weight of the particles of a dispersion inhibitor, being a solid organic material having a solubility in water of 50 ppm max at 25°C and a softening point in the range 100°F to 200°F, said material being selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof, substantially all of the individual particles having a size within the range $10\mu$ to $500\mu$, said product having a solubility in water of 50 ppm max at 25°C and having a softening point in the range 100° to 200°F.

14. A detergent composition according to claim 13 wherein substantially all of the particles of said particulate combination have a size within the range $25\mu$ to $250\mu$.

15. A detergent composition according to claim 13 wherein the particles of said particulate combination have a softening point in the range 150°F to 175°F.

16. A detergent composition according to claim 13 wherein the weight ratio of quaternary ammonium compound to dispersion inhibitor lies in the range of 1:1 to 4:1.

17. A detergent composition according to claim 13 wherein the intimate mixture is formed of a solidified comelt of the quaternary ammonium compound and the dispersion inhibitor.

18. A granular detergent additive product consisting essentially of:

1. 5 to 95% by weight of the product of a particulate consisting essentially of:

A. 80 to 20% by weight of the particles of quaternary ammonium compounds of formula $[R_1R_2R_3R_4N]^+Y^-$, wherein at least one of $R_1R_2R_3$ and $R_4$ is an organic radical containing a group selected from a $C_{16}$–$C_{22}$ aliphatic radical, or an alkyl phenyl or alkyl benzyl radical having 10 to 16 carbon atoms in the alkyl chain, the remaining group or groups being selected from $C_1$–$C_4$ alkyl, $C_2$–$C_4$ hydroxyalkyl, and cyclic structures in which the nitrogen atom forms part of the ring, Y constituting an anionic radical selected from the group consisting of halide and methosulfate ions, B. 20 to 80% by weight of the particles of a dispersion inhibitor, being a solid organic material having a solubility in water of 50 ppm max at 25°C and a softening point in the range of 100°F to 250°F, said material being selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof, substantially all of the individual particles having a size within the range 10μ to 500μ, said product having a solubility in water of 50 ppm max at 25°C and having a softening point in the range 100° to 200°F;

2. 95 to 5% by weight of the product of a detergent adjunct selected from the group consisting of organic and inorganic detergency builders, chlorine and peroxybleach compounds, soil suspending agents, suds modifiers, enzymes, antibacterial agents, and optical brighteners, and mixtures of any of the foregoing.

19. A granular detergent additive product according to claim 18 wherein the detergent adjunct is a detergency builder selected from the group consisting of alkali metal, ammonium and alkanolammonium, polyphosphates, pyrophosphates, bicarbonates, carbonates, silicates, borates, nitrilotriacetates, and citrates.

20. A granular detergent additive product according to claim 18 wherein the detergent adjunct is a detergency builder selected from the group consisting of alkali metal zeolite A, B and Y-type materials.

21. A granular detergent additive product according to claim 18 wherein the detergent adjunct is a detergency builder, is a seeded builder, comprising a 30:1 to 5:1 mixture of sodium carbonate and particulate calcium carbonate having an average particle diameter of from 0.01 to 5 microns.

22. A granular additive product according to claim 18 wherein the bleach is selected from the group consisting of sodium perborate, sodium percarbonate, and potassium monopersulfate.

23. A granular detergent additive product according to claim 18 wherein the enzyme is selected from the group consisting of alkaline and neutral proteases and amylase, and mixtures thereof.

24. A granular detergent composition adapted to prevent static buildup on textiles laundered therewith consisting essentially of:
 1. 10 to 25% by weight of the compositions of an anionic surfactant selected from the group consisting of $C_{10-12}$ linear and branched alkyl benzene sulfonates, $C_{10-20}$ linear alkyl sulfates, $C_{10-20}$ alkyl polyoxyalkylene ether sulfates containing one to four oxyalkylene groups and mixtures thereof;
 2. 10 to 60% by weight of the composition of a detergent builder salt;
 3. 3 to 25% by weight of the composition of a particulate combination comprising an intimate mixture consisting essentially of:
  A. 80 to 20% by weight of the particles of quaternary ammonium compounds of formula $[R_1R_2R_3R_4N]^+Y^-$, wherein at least one of $R_1R_2R_3$ and $R_4$ is an organic radical containing a group selected from a $C_{16}$–$C_{22}$ aliphatic radical, or an alkyl phenyl or alkyl benzyl radical having 10 to 16 carbon atoms in the alkyl chain, the remaining group or groups being selected from $C_1$–$C_4$ alkyl, $C_2$–$C_4$ hydroxyalkyl, and cyclic structures in which the nitrogen atom forms part of the ring, Y constituting an anionic radical selected from the group consisting of halide and methosulfate ions,
  B. 20 to 80% by weight of the particles of a dispersion inhibitor, being a solid organic material having a solubility in water of 50 ppm max at 25°C and a softening point in the range of 100°F to 200°F, said material being selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof, substantially all of the individual particles having a size within the range 10μ to 500μ, said product having a solubility in water of 50 ppm max at 25°C and having a softening point in the range 100° to 200°F.

25. A granular detergent composition according to claim 24 wherein the detergent builder is present in an amount of from 15 to 45% by weight of the composition.

26. A granular detergent composition according to claim 24 wherein the detergent builder comprises a water soluble salt selected from the group consisting of alkali metal, ammonium and alkanolammonium, polyphosphates, pyrophosphates, bicarbonates, carbonates, silicates, borates, nitrilotriacetates, and citrates.

27. A granular detergent composition according to claim 24 wherein the detergent builder is selected from an alkali metal zeolite A, B and Y-type materials.

28. A granular detergent composition according to claim 24 wherein the detergent builder is a seeded builder comprising a 30:1 to 5:1 mixture of sodium carbonate and particulate calcium carbonate having an average particle diameter of from 0.01 to 5 microns.

29. A granular detergent composition according to claim 24 including 5 to 20% by weight of the composition of a smectite clay selected from the group consisting of alkali metal and calcium montmorillonites, alkali metal saponites and hectorites, and mixtures thereof.

30. A granular detergent composition according to claim 24 including 0.1 to 5% of a fabric conditioning agent serving to reduce wrinkling.

31. A granular detergent composition according to claim 30 wherein the fabric conditioning agent is corn starch.

32. A process for conditioning fabrics comprising the steps of:
 1. contacting said fabrics with an effective amount of a particulate additive product comprising an intimate mixture of:
  A. 80 to 20% by weight of the particles of quaternary ammonium compounds of formula $[R_1R_2R_3R_4N]^+Y^-$, wherein at least one of $R_1R_2R_3$ and $R_4$ is an organic radical containing a group selected from a $C_{16}$–$C_{22}$ aliphatic radical, or an alkyl phenyl or alkyl benzyl radical having 10 to 16 carbon atoms in the alkyl chain, the remaining group or groups being selected from $C_1$–$C_4$ alkyl, $C_2$–$C_4$ hydroxyalkyl, and cyclic structures in which the nitrogen atom forms part of the ring, Y constituting an anionic radical selected from the group consisting of halide and methosulfate ions,
  B. 20 to 80% by weight of the particles of a dispersion inhibitor, being a solid organic material having a solubility in water of 50 ppm max at 25°C and a softening point in the range of 100°F to 200°F, said material being selected from the group consisting of paraffinic waxes, cyclic and acyclic mono- and polyhydric alcohols, substituted and unsubstituted aliphatic carboxylic acids, esters of the foregoing alcohols and acids, $C_3$–$C_4$ alkylene oxide condensates of any of the foregoing materials and mixtures thereof, substantially all of the individual particles having a size with the range $10\mu$ to $500\mu$, said product having a solubility in water of 50 ppm max at 25°C and having a softening point in the range 100° to 200°F; subjecting the fabrics to a temperature within the range of from 125° to 200°F.

33. A process according to claim 32 wherein the conditioning agent is applied to the fabrics from an aqueous bath.

34. A process according to claim 33 wherein the conditioning agent is applied to the fabrics from a laundry wash liquor.

35. A process according to claim 33 wherein the fabrics are caused to move relative to each other while being subjected to a temperature in the range of 125° to 200°F.

36. A process according to claim 35 wherein the relative movement is a tumbling action.

* * * * *